United States Patent [19]

Wienand et al.

[11] Patent Number: 4,851,049
[45] Date of Patent: Jul. 25, 1989

[54] THERMOSTABLE BISMUTH VANADATE/MOLYBDATE PIGMENTS

[75] Inventors: Henning Wienand, Neulussheim; Werner Ostertag, Gruenstadt; Christoph Schwidetzky, Limburgerhof; Helmut Knittel, Ludwigsburg, all of Fed. Rep. of Germany

[73] Assignee: BASF Aktiengesellschaft, Ludwigshafen, Fed. Rep. of Germany

[21] Appl. No.: 130,652

[22] Filed: Dec. 9, 1987

[30] Foreign Application Priority Data

Dec. 18, 1986 [DE] Fed. Rep. of Germany ....... 3643247

[51] Int. Cl.$^4$ .............. C09C 1/00; C08J 7/04
[52] U.S. Cl. .................... 106/479; 106/482; 106/502
[58] Field of Search ........... 106/288 B, 308 B, 308 M, 106/309, 479, 502, 482

[56] References Cited

U.S. PATENT DOCUMENTS

| | | | |
|---|---|---|---|
| 3,470,007 | 9/1969 | Linton | 106/434 |
| 3,639,133 | 2/1972 | Linton | 106/434 |
| 4,063,956 | 12/1977 | Higgins | 106/288 B |
| 4,230,501 | 10/1980 | Howard et al. | 106/308 M |
| 4,455,174 | 6/1984 | Wienand et al. | 106/288 B |
| 4,530,725 | 7/1985 | Ostertag et al. | 106/298 |

*Primary Examiner*—Paul Lieberman
*Assistant Examiner*—Christine A. Skane
*Attorney, Agent, or Firm*—Oblon, Spivak, McClelland, Maier, & Neustadt

[57] ABSTRACT

Thermostable bismuth vanadate/molybdate pigments are prepared by precipitating onto a pigment, obtained by calcination, of the formula $$BiVO_4 \cdot n\, Bi_2MoO_6$$

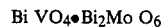

where n is 0.2–2.5, in aqueous suspension at 70°–100° C. within the pH range from 4 to 9.5 a first SiO$_2$-containing layer using an alkali metal silicate solution of a magnesium hexafluorosilicate solution, maintaining the suspension at 70°–100° C. for not less than 1 hour, producing a thick coating on the precoated pigment by adding further alkali metal silicate solution, magnesium hexafluorosilicate solution or a mixture of the two within the pH range from 4 to 9.5, and finally depositing wax on the SiO$_2$-containing layer by means of a waxing emulsion/dispersion, the products showing, compared with the starting pigment, an appreciably improved thermal stability in plastics.

13 Claims, No Drawings

THERMOSTABLE BISMUTH VANADATE/MOLYBDATE PIGMENTS

Pigments based on bismuth vanadate/molybdate are bright yellow colorants and are regarded as nontoxic. Their preparation is described in detail in EP-A-74,049. The use of these pigments is restricted to coating compositions, since the thermostability of bismuth vanadate/molybdate, on account of the easy reducibility of molybdate and vanadate by the organic matrix, is not sufficient for use in plastics.

Although it is known that the stability of bismuth vanadate/molybdate pigments can be enhanced by means of inorganic coatings, for example of zirconium silicate, prior art stabilizer coatings produce improvements only in light and weather fastness and acid stability; they do not provide adequate thermostability.

Although bismuth vanadate/molybdate is calcined at 600° C., giving the bright yellow color, it is not possible in practice to incorporate the pigment in plastics without change in hue. At the processing temperatures, the vanadate/molybdate is reduced at the surface by the plastics matrix and undergoes a substantial color shift toward green.

In the past there were attempts to stabilize pigments based on pure monoclinic bismuth vanadate. For instance, in U.S. Pat. No. 4,063,956 monoclinic $BiVO_4$ is coated first with from 0.2 to 20% by weight of an aqueous metal oxide and then with a second dense coat of amorphous silicon dioxide (amount: from 2 to 40% by weight). Suitable for the first coating are hydrated oxides of Al, Si, Ti, B, Mn, Sn, Hf, Th, Nb, Zr, Ta, Zn, Mo, Ba, Sr, Ni or Sb.

The second dense coating may contain, in addition to the $SiO_2$, up to 5% by weight of aluminum oxide. (The %ages by weight are based on the pigment to be coated.)

The processing method of U.S. Pat. No. 4,063,956 is not immediately applicable to the bismuth vanadate/molybdate pigments of EP-A-74,049, since the monoclinic bismuth vanadate of said U. S. patent is an aqueous precipitation product having a correspondingly active surface. By contrast, the surfaces of the bismuth vanadate/molybdate pigments of EP-A-74,049 become substantially dehydrated in the course of preparation, as a consequence of the process of calcination, and therefore no longer have sufficient adhesivity for holding in place a coating agent precipitated thereon. It is common knowledge in the art that a freshly precipitated pigment surface still occupied with active OH groups is capable of strong sorption to coating agent precipitated thereon. These sorptive OH groups are almost completely absent in calcined products. For this reason, an attempt to coat the pigments with a thicker layer in a conventional manner usually only leads to loose, flake envelopes adhering only poorly to the surface, instead of dense firm coatings.

Thicker and/or dense coatings are desirable in particular for improving the thermostability of pigments. The problem of obtaining dense, firmly adhering coatings was investigated in particular in the case of pigments based on lead chromate and solved for example in DE-A-1,7807.890, and De-A-1,807,891 and EP-A-130,272, although these cases are concerned with a totally different pigment system. In the cases mentioned, the desired thermostability was obtained by coating the pigment surface with 2-40% by weight of silicon dioxide or hydrolysis products of magnesium hexafluorosilicate. In addition, further improvements are said to be obtainable by aftertreating the coated pigment with a salt of a resin acid. The key difference to the present problem is that the pigments described there, like the pigments of U.S. Pat. No. 4,063,956, are precipitation products prepared under aqueous conditions and having hydrophilic surfaces, which are relatively easy to coat. A disadvantage of the treatment with salts of resin acids, for example the precipitation onto the pigment of rosin in the form of the calcium salt, are possible changes in the hue as a consequence of the self-color of the resin acid, for example rosin.

Accordingly, simply applying existing stabilizing methods to the bismuth vanadate/molybdate system is not possible. Analysis of the prior art reveals that for inorganic colored pigments all the past experience relates only to the stabilizing of precipitation products prepared in aqueous media.

It is an object of the present invention to provide a bismuth vanadate/molybdate pigment suitable for incorporation in plastics. Achieving the stated object amounts to solving the problem of how the product, prepared by calcination, can be activated at its surface in such a way that firmly adhering and dense protective layer can be applied thereto. Toxicologically unsafe elements, in particular heavy metals, should not be part of the protective layer.

We have found that this object is achieved in a process for preparing a bismuth vanadate/molybdate pigment having improved application properties by precipitating onto the pigment obtained by calcination and having the formula

$$BiVO_4 \bullet nBi_2MoO_6$$

where n is 0.2–2.5, in aqueous suspension at 70°–100° C. a first $SiO_2$-containing layer from an alkali metal silicate solution at pH 4–8.5 or from a magnesium hexafluorosilicate solution at pH 5.5–9.5, maintaining the suspension at 70°–100° C. for not less than 1 hour, then adding to the suspension either at pH 4–8.5 further alkali metal silicate solution or at pH 5.5–9.5 further magnesium hexafluorosilicate solution or at pH 4.5–9.5 a mixture of alkali metal silicate solution and magnesium hexafluorosilicate solution, thoroughly mixing the resulting mixture at 70°–100° C. until a dense coating has been precipitated on the pigment, then adding to the mixture a wax emulsion/dispersion, and depositing the wax on the pigment.

The bismuth vanadate/molybdate pigments obtained by the process according to the invention, compared with the starting pigment, have an appreciably improved thermostability in plastics coupled with otherwise identical application properties.

The superior thermostability is crucially dependent not only on the coating with the $SiO_2$-containing layer but also on the organic coating (impregnation with wax). This was not foreseeable since it is known that a number of substances have a destructive effect on deposited silicon dioxide layers (K. Iler, The Chemistry of Silicon, 1979, p. 430, John Wiley & Sons).

The process is generally carried out by first depositing on the pigment obtained by calcination a thin layer of $SiO_2$ or of hydrolysis products of magnesium hexafluorosilcate (layer 1; precoating). The pigment thus provided with layer 1 is then maintained in aqueous suspension at an elevated temperature in order to eliminate flaws in the said coating and complete the deposition.

The pigment thus coated with layer 1 is then coated at 70°–100° C. with a thick and dense layer of $SiO_2$ and/or hydrolysis products of magnesium hexafluorosilicate (layer 2; main coating).

Thereafter the pigment is coated with a wax in a conventional manner, isolated in a conventional manner, for example by filtering off with suction or centrifuging, dried and ground into a powder.

The starting material in the process described in EP-A-74,049 comprises a bismuth vanadate/molybdate pigment of formula $$BiVO_4 \cdot nBi_2MoO_6 \quad (1)$$

where n is 0.2–2.5.

To precoat (I), it is dispersed in water and treated in suspension with sodium silicate solution or magnesium hexafluorosilicate. The suspension is then brought to pH 4–8.5 or pH 5.5–9.5.

The amount of sodium silicate or magnesium hexafluorosilicate should be dimensioned in such a way that the amount of $SiO_2$ formed therefrom ranges from 1 to 10% by weight, based on (I). Preferably, the amount of alkali metal silicate or magnesium hexafluorosilicate used to precoat (I) are preferably such that (I) becomes coated with 2–5% by weight of $SiO_2$.

Preferably, the precoating is carried out under wet grind conditions by grinding (I) in the form of a suspension in a wet grind apparatus in the presence of sodium silicate or magnesium hexafluorosilicate. More particularly, the precoating is effective as part of the deagglomeration wet grinding customary with calcined products. In deagglomeration grinding, the pigment, which is coated with a thin layer, is maintained at 70°–100° C. in the $SiO_2$-containing suspension to improve the homogeneity and the adhesion-promoting properties of layer 1.

This heat treatment should take not less than 1 hour but preferably takes from 8 to 10 hours, depending on the temperature.

By measuring the zeta potentials we have been able to show that this method of carrying out the first coating achieves complete coverage of the pigment surface.

The quality of the product according to the invention can be further improved by subjecting the pigment coated with layer 1 to a gentle wet grind at the end of the coating and aging phase.

In addition, the quality of the pigment produced according to the invention can be improved by isolating the pigment coated with layer 1 after the coating and aging phase, drying it at 80°–120° C. and then subjecting it to a gentle dry grind, for example in a pin disk mill or in a centrifugal mill.

A further version of the process according to the invention comprises following the precoating and aging of the first coating and if desired the measures described in the preceding paragraph, namely isolating, drying and gentle grinding, by additionally applying an adhesion-promoting layer of an organic silicon compound. To this end, the aqueous suspension, if desired after a brief wet grind, has added to it a solution of an organic silane in water. The temperature is raised to 40°–100° C., preferably 40°–90° C., to hydrolyze the silane. The hydrolysis products precipitate in the form of a thin film on layer 1. By choosing a suitable silane it is thus possible to create a surface of improved activity for the subsequent main coating. Preference is given in the present case to silanes which contain one or more amino groups, eg. gamma-aminopropyltrimethoxysilane, gamma-aminopropyltriethoxysilane N-aminoethyl-3-aminoproyltrimethoxysilane and mixtures thereof.

This is followed by the actual coating of (I) with $SiO_2$ and/or hydrolysis products of magnesium hexafluorosilicate (main coating phase). To succeed in applying a continuous coat in a reliable and readily reproducible manner, an advantageous procedure comprises adding to the aqueous suspension of precoated (I) an aqueous solution of alkali metal silicate, for example sodium silicate, and then bringing the mixture with acid to pH 4–8.5, preferably pH 5.5–7.5. Instead of an alkali metal silicate it is also possible to use a solution of magnesium hexafluorosilicate. In this case, the suspension is brought to pH 5.5–9.5 with an alkali metal hydroxide solution. It is also possible to use the basic alkali metal silicate solution with the acid magnesium hexafluorosilicate solution or with mixtures of the fluorosilicate acid for setting the desired pH. In the course of the precipitation, the temperature is in the range from 70 to 100° C., preferably within the range from 70 to 90° C.

A variant for applying the main coating comprises metering an alkali metal silicate solution and a solution of magnesium hexafluorosilicate simultaneously at a constant pH within the range from 5–9.0 to the suspension of precoated (I). By maintaining a constant pH and a uniform rate of addition of two components, very homogeneous coatings are obtained, which is why this variant is particularly preferred.

The duration of the second coating ranges in general from 30 to 240 min, preferably from 60 to 120 min.

The amount of silicon-containing coating applied depends on the free surface area of (I). In general, the pigment will have a BET surface area from 3 to 15 $m^2/g$. The desired temperature stability is obtained when the coating has an Mg content from 0.5 to 10%, an Si content from 2 to 25% and a F content from 0.3 to 20%, based on the coated pigment.

Thereafter, coated (I) is coated with wax. To this end, a wax emulsion/dispersion is added to the aqueous suspension, and the mixture is stirred at 40°–100° C., preferably at 70°–90° C. Advantageously, the wax is precipitated onto the coated pigment by adding an electrolyte such as a calcium, zinc or magnesium salt.

The ready-prepared pigment is then isolated from the aqueous suspension, washed and dried.

Suitable waxes for the final coating are for example polyethylene waxes and oxidized polyethylene waxes (so-called OA waxes) ranging in molecular weight from 1,000 to 10,000, in particular from 2,500 to 7,000.

The wax is preferably applied in the form of an aqueous emulsion or dispersion. The amount of wax is in generally dimensioned in such a way that the pigment is coated with 2–40% by weight, preferably 5–20% by weight, of wax, based on the ready-prepared pigment.

The process is explained in more detail by the working examples which follow. The percentages are by weight.

I. Testing of thermal stability

I(a) To test the thermal stability, the products are incorporated in an extruder in an acrylonitrile-butadiene-styrene copolymer, the mixture is heated in a screw injection molding machine to test temperatures from 220° to 300° C. and maintained at that temperature for 5 minutes, and thereafter injection molding into sheets. The molding obtained at 220° C. serves as comparison.

I(b) The test is as under I(a), except that the polymer used is HD polyethylene.

I(c) The sheets obtained under I(a) and I(b) are measured photometrically, and the measurements are analyzed colorimetrically to calculate the color difference ΔE between black (X=Y=Z=0) and the color loci of sample and comparison in accordance with German Standard Specification DIN 6174. The measure used for the thermal stability is the difference ΔE' between ΔE$_{comparison}$ and ΔE$_{sample}$:

$$E\Delta_{comparison} - E\Delta_{sample} \times \Delta E.$$

II. Working examples

EXAMPLE 1

1.1 Pigment suspension 4,626,8 g of aqueous pigment suspension containing 300 g of the pigment $BiVO_4 \cdot n\ Bi_2MoO_6$ (n=0.75) are passed in the presence of 40.1 g of a sodium silicate solution (containing 30% of $SiO_2$ and 8% of $Na_2O$) in the course of 30 min through a bead mill (Dyno®-Mill; speed of rotation: 15 m/sec; annular gap clearance: 0.1 mm). The suspension thus obtained is introduced into a 6-liter stirred flask and heated with stirring to 95° C. At that temperature a solution of 76.6 g of sodium silicate in 325 g of water is added to the pigment suspension in the course of 60 min. By simultaneously adding a 10% aqueous $MgSiF_6$ solution the pH is maintained at constant pH 8.5 during the addition to the suspension. In total, this requires 97.9 g of the $MgSiF_6$ solution. Thereafter the pigment is stirred at 95° C. and pH 8.5 for 15 min. The suspension of the coated pigment is subsequently divided into three parts, which are treated as described under 1.2 to 1.4.

1.2 Coating with wax To 1,542.2 g of pigment suspension 1.1 are added at room temperature 270 g of a 0.8% strength emulsion of a polyethylene wax (Poligen®WE1) and stirred in at 400 r.p.m. for 30 min. The pH is 10.0. A solution of 20.9 g of $CaCl_2 \cdot 6\ H_2$) and 62.5 g of $H_2O$ is then added in the course of 30 min. The pH is then 8.5. The suspension is then heated to 100° C. in the course of 40 min. during which a pH of 7.0 becomes established, subsequently stirred at 100° C. for 30 min and then filtered with suction to remove the pigment, which is washed and dried.

Analysis of coating:
Mg=0.41%, Ca=2.5%, Si=4.2%.

1.3 Coating with oxidized PE wax

To 868.9 g of pigment suspension 1.1 are added 100 g of a 15% strength emulsion of oxidized PE wax and stirred in at room temperature at 400 r.p.m. The pH is 6.9. A $CaCl_2$ solution of 11.8 g of $CaCl_2 \cdot 6\ H_2O$ and 35. g of $H_2O$ is added dropwise to the suspension at room temperature in the course of 30 min, raising the pH to 8.9. The suspension is heated to 100° C. and stirred at that temperature for 30 min; this is followed by filtration with suction and dried.

Analysis of coating:
Mg=0.35%, Ca=2.6%, Si=4.1%.

1.4 Coating with rosin/Ca salt (comparative test)

1,542.2 g of pigment suspension 1.1 are heated to 95° C., the pH being 8.7. A rosin solution comprising 26.63 g of rosin, 34.6 g of NaOH and 241.3 g of $H_2O$ is then added in the course of 30 min. After all the rosin solution has been run in, the temperature is raised to 100° C., the pH being 9.2. A solution of 20.9 of $CaCl_2 \cdot 6\ H_2O$ in 62.5 g of $H_2O$ is then added dropwise in the course of 30 min. The pH is then 7.6. The suspension is subsequently stirred for 30 min at 95°–100° C. Thereafter the pigment is filtered off, washed and dried at 90° C.

Analysis of coating:
Mg=0.2%, Ca=1.8%, Si=0.42%.

1.5 Testing of pigments

The pigments obtained under 1.2 to 1.3 and the uncoated starting pigment ware incorporated in accordance with I(a) into the ABS polymer and tested. The sheets obtained are evaluated as specified in I(b). The ΔE' value determined are shown in Table 1.

TABLE 1

| | ΔE' Temperature [°C.] | | | | |
|---|---|---|---|---|---|
| | 220 (Comparison) | 240 | 260 | 280 | 300 |
| Starting pigment (uncoated) | 0 | 6.9 | 19.6 | 35.1 | 52.6 |
| Pigment from 1.4 | 0 | 3.4 | 7.8 | 13.5 | 19.0 |
| Pigment from 1.2 | 0 | 1.5 | 4.2 | 7.9 | 14.8 |
| Pigment from 1.3 | 0 | 3.2 | 5.5 | 9.3 | 14.2 |

The hue differences between colorations with the pigment coated with rosin/Ca salt and with the wax coated pigment are shown in Table 2.

TABLE 2

Hue differences in ΔE values (Cielab); comparison between pigment coated with rosin/Ca salt and pigments coated with wax

| | ΔE' Temperature [°C.] | | | | |
|---|---|---|---|---|---|
| | 220 (Comparison) | 240 | 260 | 280 | 300 |
| Pigment from 1.4 | 10.9 | 12.6 | 14.6 | 17.1 | 18.9[1] |
| Pigment from 1.2 | 0 | 0 | 0 | 0 | 0 |

[1]more greenish, duller

According to a visual coloristic assessment, the coloration with the pigment from 1.2 is appreciably yellower and purer.

EXAMPLE 2

2.1 Pigment suspension 2,780 g of an aqueous pigment suspension containing 180 g of $BiVO_4 \cdot 0.75\ Bi_2MoO_6$ are bead-milled in the presence of 20 g of $MgSiF_6 \cdot 6H_2O$ ad described in 1.1. The suspension obtained is subsequently concentrated to a pigment content of 10%, by removing 1,000 g of $H_2$), and heated to 95° C. By adding 375 ml of 20% strength sodium silicate solution the pH is raised from pH 1.1 to pH 8.5. 145.5 g of sodium silicate (30% of $SiO_2$, 8% of $Na_2O$), dissolved in 617.5 g of water, are then added dropwise at 95° C. in the course of 60 min, and the pH is maintained at a constant 8.5 by simultaneous addition of a total of 96.5 g of a 10% strength $MgSiF_6$ solution. After the addition has ended, the reaction mixture is stirred for 30 min, and then diluted with 620 g of $H_2O$ and then divided into three parts of 1.215 g of suspension each. These three parts are provided with an organic coating as described hereinafter.

2.2 Coating with wax

To 1,215 g of the suspension obtained under 2.1 are added at 100° C. (pH 8.5) 45.1 g of a PE wax emulsion (35% strength) in 115.9 g of $H_2O$ over 30 min. The wax is then precipitated by adding a 25.1% strength $CaCl_2$ solution (12.4 g of $CaCl_2 \cdot 6H_2O$ in 37.1 g of $H_2O$) (in the course of 30 min). After a further 30 min at 100° C. the pigment is filtered off with suction and dried at 80° C.

2.3 Coating with oxidized PE wax

To 1,215 g of the suspension obtained under 2.1 is added at 100° C. and a starting pH of 8.5 an emulsion (52.6 g, 30% strength) containing oxidized PE wax in 52.6 g of $H_2O$. The pH is 8.3 at 100° C. The waxs is then precipitated at 100° C. by adding a solution of 12.4 g of $CaCl_2 \cdot 6H_2O$ in 37.1 g of $H_2O$ (in the course of 30 min). After a further 30 min at 100° C. the pigment is filtered off with suction and dried.

2.4 Coating with rosin/Ca salt

To 1,215 g of the suspension described under 2 is added at 100° C. and a starting pH of 8.5 a 9.8% strength rosin solution (16.9 of colophony root resin and 2.28 g of solid NaOH in 152.7 g of $H_2O$) over 30 min. The rosin is then precipitated by adding a 25.1% strength $CaCl_2$ solution (12.4 g of $CaCl_2 \cdot 6 H_2O$ in 37.1 g of $H_2O$) over 30 min. After a further 30 min at 100° C. the pigment is filtered off with suction and dried.

2.5 Testing of pigments

The pigments obtained under 2.2 to 2.4 are incorporated (2% strength) in the polymer specified in 1.5, and each mix is tested for 5 min within the temperature range from 220° to 280° C. Table 3 shows the measured color changes at ΔE value (determined in accordance with Cielab).

|  | ΔE' Temperature [°C.] | | | |
| --- | --- | --- | --- | --- |
|  | 220 (Comparison) | 240 | 260 | 280 |
| Pigment from 2.4 | 0 | 2.6 | 6.5 | 13.2 |
| Pigment from 2.2 | 0 | 2.0 | 5.2 | 8.5 |
| Pigment from 2.3 | 0 | 2.0 | 5.5 | 12.1 |

3.1 Pigment suspension 100 g of pigment $BiVO_4 \cdot n\ Bi_2MoO_6$ (n=0.75) are suspended in 1,000 of $H_2O$, and the suspension is heated to 95° C. The pH is then adjusted to pH 8.5 by adding 25 g of 20% strength sodium hydroxide solution. Thereafter, 401.6 g of a 19.1% strength sodium silicate solution (76.6 g of sodium silicate in 325 g of $H_2O$) are then added dropwise in the course of 60 min, during which the pH is maintained at a constant value of 8.5 by simultaneously adding 95.3 g of a 10% strength $MgSiF_6$ solution.

3.2 Coating with PE wax

To the suspension obtained under 3.1 are added at 100° C. 76.1 g of a 35% strength PE wax emulsion in 195.4 g of $H_2O$ (pH 8.4 at 100° C.). Thereafter a solution of 20.9 g of $CaCl_2 \cdot 6H_2O$ in 62.6 g of $H_2O$ is added dropwise to the suspension, and the suspension is then maintained at 100° C. for 30 min. The pigment is filtered off with suction and dried.

3.3 Coating with oxidized PE wax

To a suspension prepared as described in 3.1 are added at 100° C. in the course of 30 min 88.8 g of a 305 strength emulsion of oxidized PE wax in 88.8 g of $H_2O$. The pH is then 8.1. Thereafter a solution of 20.9 g of $CaCl_2 \cdot 6H_2O$ in 62.5 g of $H_2O$ is added dropwise in the course of 30 min. The pH is then 7.8 (100° C.). The pigment is then filtered off with suction and dried.

3.4 Testing of pigments

The heat stability of the pigments obtained as described in 3.2 and 3.3 is determined in accordance with Ia), and the colorations are evaluated in accordance with Ic). Table 4 gives the results in comparison with experiments 2.2 and 2.3.

TABLE 4

|  | ΔE' Temperature [°C.] | | | |
| --- | --- | --- | --- | --- |
|  | 220 (Comparison) | 240 | 260 | 280 |
| Pigment from 3.2 | 0 | 3.3 | 7.9 | 12.5 |
| Pigment from 2.2 | 0 | 2.0 | 5.2 | 8.5 |
| Pigment from 3.3 | 0 | 4.3 | 7.6 | 17.0 |
| Pigment from 2.3 | 0 | 2.0 | 5.5 | 12.1 |

EXAMPLE 4

4.1 Pigment suspension 2,500 g of an aqueous suspension containing 300 g of $BiVO_4 \cdot n\ Bi_2MoO_6$ (n=0.75) are passed over 30 min through a bead mill (Dyno-Mill, speed of rotation: 15 m/sec; annular clearance: 0.1 mm). The suspension is transferred to a 4-liter stirred flask and heated with stirring to 95° C. A solution of 90 g of sodium silicate in 900 ml of $H_2O$ is added to this suspension at 90° C. Thereafter the pH is reduced to 6.4 in the course of 2 h by adding 233 g of 6% strength $HNO_3$. The suspension is subsequently stirred at 90° C. for 2 h, and the precoated product is filtered off, washed and dried. Thereafter the pigment is ground in a centrifugal mill. 125 g of the pigment thus precoated are dispersed in 875 g of $H_2O$ using a disperser (Ultra Turax ® from Jahnke und Kunkel, Freiburg). To the suspension are added a solution of 7.5 g of gamma-aminopropyltriethoxysilane in 125 g of $H_2O$ in the course of 10 min. The suspension is neutralized with 53 g of 6% $HNO_3$ and then heated to 100° C. At that temperature it is subsequently stirred for 30 min and then has added to it a solution of 83 g (26% strength) in 700 g of $H_2O$ in the course of 30 min. The pH of the suspension is then reduced in the course of 3 h by adding 415 g of 6% strength $HNO_3$. The suspension is subsequently stirred at 100° C. for 2 h, and the pigment is filtered off with suction and dried.

4.2 Coating with polyethylene wax

To the suspension obtained as described in 4.1 are added at 100° C. 76.1 g of a 35% strength emulsion of PE wax in 195.4 of $H_2O$ (pH 8.4 at 100° C.). A solution of 20.9 g of $CaCl_2 \cdot 6H_2$) and 62.5 g of $H_2O$ is then added dropwise to the suspension. After 30 min at 100° C. the pigment is filtered off with suction and dried.

4.3 Coating with rosin/ Ca salt

To the suspension obtained under 4.1 is added at 100° C. (pH 8.5) a solution of 26.6 g of colophony root resin, 3.60 g of solid NaOH and 250.0 g of H₂O over 30 min. The rosin is then precipitated by adding a solution of 20.9 g of CaCl₂•6H₂O in 60.0 g of H₂O over 30 min. After a further 30 min at 100° C. the pigment is filtered off under suction and dried.

4.4 Testing of pigments

The pigments obtained in 4.1 to 4.3 are tested in ABS polymers in respect of heat stability in accordance with I(a), and the colorations are analyzed in accordance with I(c). Table 5 below shows the $\Delta E$ values measured.

TABLE 5

|  | $\Delta E'$ Temperature [°C.] | | | |
| --- | --- | --- | --- | --- |
|  | 220 (Comparison) | 240 | 260 | 280 |
| Pigment from 4.1 (without impregnation) | 0 | 2.2 | 5.8 | 12.3 |
| Pigment from 4.3 (with rosin) | 0 | 1.7 | 3.5 | 8.7 |
| Pigment from 4.2 (with PE wax) | 0 | 1.5 | 4.1 | 8.0 |

We claim:

1. A process for preparing a bismuth vanadate/molybdate pigment having improved application properties, which comprises precipitating onto the pigment obtained by calcination and having the formula $$BiVO_4 \cdot nBi_2MoO_6$$

where n is 0.2–2.5, in aqueous suspension at 70°–100° C. a first SiO₂-containing layer from an alkali metal silicate solution at pH 4–8.5 or from a magnesium hexafluorosilicate solution at pH 5.5–9.5, maintaining the suspension at 70°–100° C. for not less than 1 hour, then coating the pigment in an aqueous suspension with an organic silane, then adding to the suspension either at pH 4–8.5 further alkali metal silicate solution or at pH 5.5–9.5 further magnesium hexafluorosilicate solution or at pH 4.5–9.5 a mixture of alkali metal silicate solution and magnesium hexafluorosilicate solution, thoroughly mixing the resulting mixture at 70°–100° C. until a dense coating has been precipitated on the pigment, then adding to the mixture a wax emulsion/dispersion comprising polyethylene wax or oxidized polyethylene wax, and depositing said wax on the pigment.

2. A process as claimed in claim 1, wherein the first SiO₂ layer on the pigment is produced by adding magnesium hexafluorosilicate solution at pH 6.5–8.5.

3. A process as claimed in claim 1, wherein the first SiO₂ layer is precipitated onto the pigment under wet grind conditions.

4. A process as claimed in claim 2, wherein the first SiO₂ layer is precipitated onto the pigment under wet grind conditions.

5. A process as claimed in claim 1, wherein after the first SiO₂-containing layer has been precipitated on, the pigment is isolated, dried and ground.

6. A process as claimed in claim 2, wherein, after the first SiO₂-containing layer has been precipitated on, the pigment is isolated, dried and ground.

7. A process as claimed in claim 3, wherein, after the first SiO₂-containing layer has been precipitated on, the pigment is isolated, dried and ground.

8. A process as claimed in claim 4, wherein, after the first SiO₂-containing layer has been precipitated on, the pigment is isolated, dried and ground.

9. A process as claimed in claim 5, wherein the ground pigment is coated in aqueous suspension with an organic silane.

10. A process as claimed in claim 6, wherein the ground pigment is coated in aqueous suspension with an organic silane.

11. A process as claimed in claim 8, wherein the ground pigment is coated in aqueous suspension with an organic silane.

12. A process as claimed in claim 1, wherein the surface is coated with a polar organic silane.

13. A process as claimed in claim 12, wherein the silane used has one or more amino groups.

* * * * *